United States Patent [19]
Ledingham

[11] Patent Number: 5,803,687
[45] Date of Patent: Sep. 8, 1998

[54] SELF-TIGHTENING COMPRESSION CLIP

[75] Inventor: Stuart J. Ledingham, Coto de Caza, Calif.

[73] Assignee: Valu Engineering, Inc., Irvine, Calif.

[21] Appl. No.: 970,294

[22] Filed: Nov. 14, 1997

Related U.S. Application Data

[63] Continuation of Ser. No. 871,284, Jun. 9, 1997, which is a continuation of Ser. No. 540,339, Oct. 6, 1995, abandoned.

[51] Int. Cl.$^6$ ........................................................ F16B 39/24
[52] U.S. Cl. .......................... 411/85; 411/116; 411/174; 411/187; 411/189; 411/531; 411/544; 411/969; 411/971; 198/836.3
[58] Field of Search ............................... 411/38, 107, 116, 411/161, 162, 185, 186, 187, 188, 189, 531, 544, 545, 959, 969, 971, 85, 174, 175; 198/836.1, 836.3

[56] References Cited

U.S. PATENT DOCUMENTS

| | | | |
|---|---|---|---|
| 2,644,502 | 7/1953 | Tinnerman | 411/107 |
| 3,614,144 | 10/1971 | Hodges | 411/38 |
| 4,011,785 | 3/1977 | Schrepferman | 411/545 |
| 4,274,324 | 6/1981 | Giannuzzi | 411/38 |
| 4,710,081 | 12/1987 | Overhues | 411/188 |
| 4,934,886 | 6/1990 | Aikens | 411/85 |
| 5,074,727 | 12/1991 | Wentzel | 411/107 |

FOREIGN PATENT DOCUMENTS

| | | | |
|---|---|---|---|
| 972287 | 10/1964 | United Kingdom | 411/38 |
| 1493220 | 11/1977 | United Kingdom | 411/531 |

*Primary Examiner*—Kenneth J. Dorner
*Assistant Examiner*—Robert G. Santos
*Attorney, Agent, or Firm*—Knobbe, Martens, Olson & Bear, LLP

[57] ABSTRACT

A compression clip of the present invention comprises a bolt and a self-tightening member having two side sections and a grooved intermediate section therebetween. The intermediate section has a hole for receiving the bolt. Preferably, the intermediate section has grooves on both an interior and exterior surface thereof. After tightening of the clip, the intermediate section flattens to become somewhat planar and the side sections are compressed inward to securely engage a guide rail or wear strip within the clip.

21 Claims, 2 Drawing Sheets

SELF-TIGHTENING COMPRESSION CLIP

This application is a continuation of U.S. Pat. application Ser. No. 08/871,284, filed Jun. 9, 1997, which is a continuation of U.S. Pat. application Ser. No. 08/540,339, filed Oct. 6, 1995, now abandoned.

BACKGROUND OF THE INVENTION

1. Field of the Invention

The present invention relates to guide rail assemblies used in assembly line and conveyor belt systems. In particular, a self-tightening compression clip is provided for securely engaging a guide rail.

2. Description of the Related Art

Clamps and clips are commonly used to grip guide rails that direct the travel of products along a predetermined path of an assembly line or conveyor system. The products are conveyed on a belt or track during the processing and packaging procedures of a typical manufacturer. Dependable fixation and alignment of the guide rails is important to ensure manufacturing efficiency and also to ensure that the products are not damaged from inappropriate contact with the guide rails.

The clips presently used with guide rails are commonly mounted to a flat support bar of a rail guide support assembly. A bolt may be separate from the clip, or the bolt may be manufactured to be integrally formed with the clip. The advantage of incorporating the bolt with the clip is that the nut is then more easily rotated onto the bolt without causing simultaneous rotation of the bolt. That is, integral bolts eliminate the need to grasp the bolt in order to prevent its rotation while rotating the nut onto the bolt shaft.

A disadvantage of present clips formed with or without the bolt is that they tend to rotate out of position about the pivot point formed by the bolt in the bar, thus causing misalignment of the guide rail in the conveyor system. Misalignment of the guide rail may be caused by undesirable torque or loading. Extra care in the assembly of these clips is necessary to avoid misalignment. Another disadvantage is that clips are manufactured with pre-bent sides which closely engage a guide rail that is inserted by sliding it in through the end of the clip. The clip must be attached to the support bar and the guide rail must be slid into the clip independently. This is awkward when the path of the conveyor system is curved or otherwise comprises tight quarters.

Another clip comprises two parts with a first piece having a bolt formed integrally such that the bolt head is flush with a middle portion of the clip. A second piece has a corresponding middle portion with a hole to receive the bolt shaft of the first piece, such that the middle portion of the second piece substantially underlies the middle portion of the first piece. This clip allows the guide rail to be inserted directly into the clip before the clip is mounted to the support bar. However, this two-piece construction can be awkward to handle and install in a conveyor system. In addition, when a locking style nut is used with this bolt, as is common, the bolt can become dislodged from the remainder of the clip and the guide rail may be able to pivot in the clip. Such pivoting of the guide rail is not advantageous. That is, the integral bolt is not suitable for some heavy duty applications because the bolt may dislodge from the clip when repeated excessive torque is applied.

Another clip is formed of aluminum instead of the preferred steel material of the aforementioned clips. This aluminum clip utilizes two ridges which form legs that deflect outwardly. When the bolt is inserted and tightened onto the support bar, a corresponding inward deflection of the sides of the clip and gripping of the guide rail inserted therebetween results. However, aluminum is usually not desirable or acceptable for use in food service environments. In addition, this aluminum clip design is difficult to manufacture out of steel.

Another clip formed from plastic utilizes an inside groove to attempt to control the deflection of the sides of the clip and has a hexagonal recess located in the middle of the clip to receive a hexagonal head of a steel bolt. The recess in this plastic clip is necessary to restrict rotation of the bolt while the nut is mounted to the bolt shaft. The plastic material is susceptible to stresses at the groove and corners. Generally, plastics do not have the strength desired for many applications. In addition, this clip design is difficult to manufacture out of steel. Further, the aluminum and plastic clips do not have adequate frictional contact with the steel support bar and, therefore, are vulnerable to rotation and misalignment of the guide rail due to the presence of undesirable torque.

SUMMARY OF THE INVENTION

A self-tightening compression clip constructed in accordance with the present invention overcomes the disadvantages of the previous clips. The clip of the present invention comprises a bolt and a self-tightening member having two side sections and an intermediate section therebetween. The intermediate section has a hole for receiving the bolt, a grooved interior surface and a grooved exterior surface. The interior surface is somewhat convex and the exterior surface is somewhat concave. After a tightening of the member that is produced by the attachment of the bolt to a rail guide support assembly, the exterior surface of the intermediate section flattens to become somewhat planar and the side sections are compressed inward toward the intermediate section to securely engage the guide rail within the clip. The clip may alternatively be used to secure or support the bed of the conveyor system, holding guide rails or wear strips beneath the products being conveyed.

In a preferred embodiment, the exterior surface forms an angle of about 160 degrees prior to tightening and about 178 degrees after tightening of the member. Preferably, the groove of the interior surface comprises a radius of curvature of about 0.016 inches forming interior groove sides about 115 degrees apart. Similarly, the groove of the exterior surface preferably comprises a radius of curvature of about 0.016 inches forming exterior groove sides about 117 degrees apart. The interior and exterior grooves are desirably separated by at least about 0.025 inches.

The exterior surface of the member's intermediate section preferably includes knurls or the like to provide an enhanced gripping surface against a support bar of the rail guide support assembly to prevent rotation and misalignment of the clip and guide rail. The self-tightening member may be formed of steel or plastic. A head of the bolt is preferably flat-sided or, more preferably, rectangular. Other head shapes incorporating at least two substantially straight sides substantially parallel to each other may alternately be used in order to prevent the bolt from rotating as a nut is secured to the bolt on the opposite side of the support bar. A washer may be placed between the nut and the support bar.

An important feature of the self-tightening compression clip of the present invention is the use of interior and exterior grooves to predict and control the amount of bending by the member at its intermediate section. The grooves facilitate manufacture of the somewhat concave/convex surfaces of the intermediate section and also facilitate the flattening of the intermediate section in a predictable fashion. The grooves are formed to be curved, rather than V-shaped or otherwise sharply angled, to maintain the structural integrity of the self-tightening member.

In an alternate embodiment, each of the side sections of the member is bent inward toward the grooved intermediate section by approximately 2 degrees from vertical such that the bolt is contained within the member for shipping and storage of the clip.

Further advantages and applications will become apparent to those skilled in the art from the following detailed description and the drawings referenced herein.

DETAILED DESCRIPTION OF THE PREFERRED EMBODIMENTS

Figure 1:
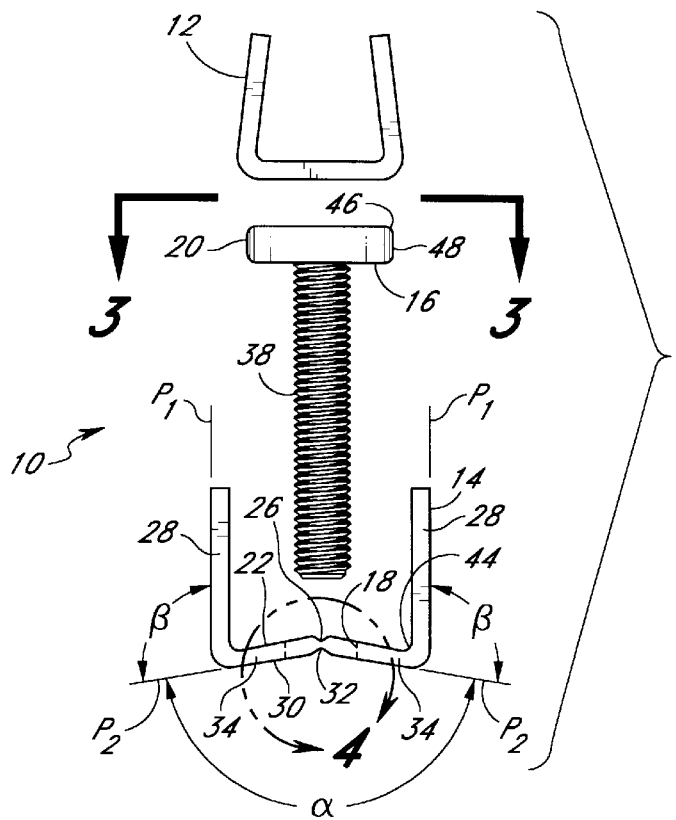
FIG. 1 is an exploded side view of a compression clip of the present invention prior to its tightening and the securing a guide rail.

A preferred embodiment of a self-tightening compression clip 10 of the present invention is illustrated in an exploded view in FIG. 1 prior to installation of a guide rail 12 and mounting to a support bar (not shown) of a rail guide support assembly. The clip 10 comprises a somewhat U-shaped member 14 and a bolt 16 received in a cylindrical hole 18 of the member 14. The rail 12 is readily inserted into the member 14 over a head 20 of the bolt 16. Alternatively, the clip 10 may be used to hold or support a wear strip member or rail (not shown) in the bed of the conveyor structure.

Figure 4:
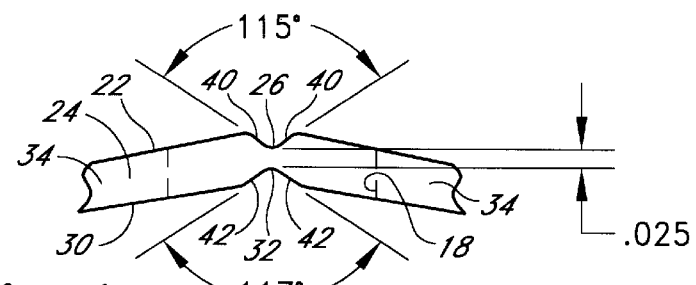
FIG. 4 is a detail view of the grooves of FIG. 1.

As shown in FIG. 1, and more clearly shown in FIG. 4, an interior surface 22 of an intermediate section 24 of the member 14 includes a groove 26 extending substantially parallel to side sections 28 of the member 14. An exterior surface 30 of the intermediate section 24 preferably also includes a groove 32 located substantially beneath the interior surface groove 26. These grooves 26, 32 preferably bisect the intermediate section 24 of the member 14. Two portions 34 of the intermediate section 24 are formed by the bisection and rise slightly upwardly from the side sections 28 toward the grooves 26, 32. Thus, the intermediate section 24 is somewhat convex at the interior surface 22 and is somewhat concave at the exterior surface 30 when viewed from an end 36 (FIG. 2) of the member 14.

Referring to FIG. 1, before tightening of the clip 10, the two side sections 28 form two planes $P_1$ which are substantially parallel. An obtuse angle $\alpha$ is formed between two planes $P_2$ which are tangential to the exterior surfaces 30 of the two portions 34 of the bisected intermediate section 24. An angle $\beta$ is formed between planes $P_1$ and $P_2$ on the outside of the member 14, for each side section 28. $\beta$ is also greater than 90 degrees; although, angle $\beta$ is preferably smaller than angle $\alpha$.

Figure 2:
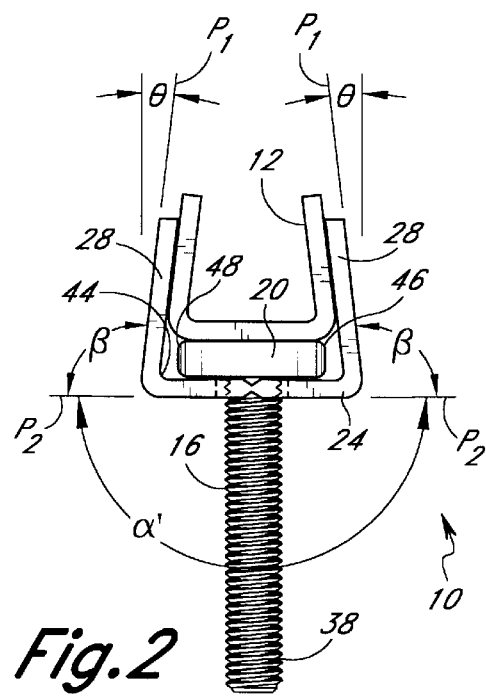
FIG. 2 is a side view of the compression clip of FIG. 1 after its tightening and the engagement of the rail.

As illustrated in FIG. 2, the two side sections 28 of the member 14 compress against the rail 12 when the bolt 16 is mounted to the support bar and a nut (not shown) is tightened on a shaft 38 of the bolt 16 on the opposite side of the support bar. The planes $P_1$ of the side sections 28 each form an angle $\theta$ with the vertical, and the rail 12 is tightly engaged by the clip 10. The intermediate section 24 of the member 14 is compressed between the bolt head 20 and the mating surface of the support bar, and the new angle $\alpha'$ between the planes $P_2$ is larger than the angle $\alpha$ illustrated in FIG. 1. A new angle $\beta'$ between planes $P_1$ and $P_2$ is approximately equal to the initial angle $\beta$; that is, $\theta \approx ((\alpha'-\alpha)/2)$.

Preferably, the planes $P_2$ each form an angle of about 10° to horizontal upon manufacture, so that the angle $\alpha$ is about 160° prior to tightening of the clip 10. After tightening, the angle $\alpha'$ is preferably about 178°. As will be easily understood by those skilled in the art, the angles $\alpha$, $\alpha'$, $\beta$, $\theta$ may be larger or smaller in alternate embodiments of the present invention. These alternative embodiments are contemplated by the present invention.

Referring to the detail view of FIG. 4, both the interior surface groove 26 and the exterior surface groove 32 of the preferred embodiment are formed with a radius of curvature of about 0.016 inches. The grooves 26, 32 are formed on the intermediate section 24 without sharp angles in order to maintain the structural integrity of the member 14. The member 14 is preferably about 0.090–0.093 inches thick, and the grooves 26, 32 are preferably separated by at least 0.025 inches. To accommodate the expected flexure by the member 14 at the grooves 26, 32, the interior surface groove 26 preferably has groove sides 40 separated by an angle of about 115° and the exterior surface groove 32 preferably has groove sides 42 separated by about 117°.

In the preferred embodiment, the intermediate section 24 (FIG. 3) is approximately rectangular and measures about 0.730×1.00 inches, and the side sections 28 substantially form rectangles measuring about 0.622×1.00 inches (not shown). Some tapering and rounding of the side section corners may be included to provide a better feel for the hands of installers of the clips 10 and also to reduce possible damage from contact of sharp edges and corners of the clips 10 with guide rails 12.

Referring to FIG. 1, inner corners 44 of the member 14 formed by the junction of the side sections 28 with the intermediate section 24 preferably have a radius of curvature of about 0.050 inches. The hole 18 for the bolt 16 is drilled during manufacture of the clip 10 to have a diameter of about 0.344 inches to accommodate a bolt diameter of about 5/16 inches, with a thread pitch/inch of about 18; although, other bolt and hole diameters may be used in the present invention as will be understood by those of skill in the art. The bolt head 20 is desirably about 0.125 inches thick, and the threaded bolt shaft 38 may be 7/8, 1⅛ or 1⅜ inches long, for example, as desired. The bolt head 20 has preferably rounded upper and lower edges 46 for the same reasons the clip's corners are preferably rounded.

Referring to FIG. 2, the bolt head 20 advantageously separates the guide rail 12 from the intermediate section 24 of the member 14. Without such a separation, the bends in the guide rail 12 may not perfectly conform to the bends 44 in the member 14. As a result, without a separation between the guide rail 12 and the intermediate section 24 of the member 14, the guide rail 12 may be permitted to undesirably rotate within the member 14, when the clip 10 is tightened. Placing the bolt head 20 between the guide rail 12 and the intermediate section 24 of the member 14 advantageously eliminates any such rotation.

Figure 3:
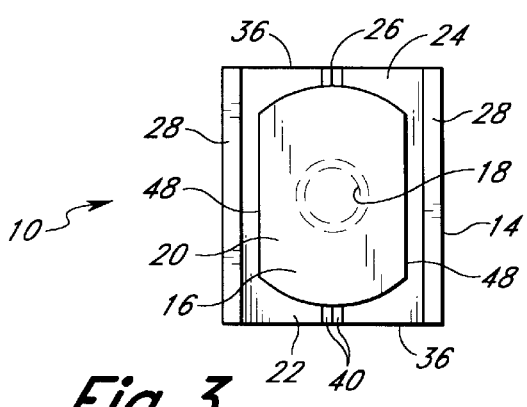
FIG. 3 is a top plan view taken along lines 3—3 of FIG. 1.

FIG. 3 shows a top view of the bolt 16 within the member 14. The bolt head 20 preferably has at least two sides 48 having substantially straight edges parallel to each other and to the side sections 28. The remaining two sides of the bolt head 20 may be rounded or straight to substantially form a rectangular shape. The dimensions of the bolt head 20 are preferably about 0.67×0.98 inches, overlying substantially the entirety of the interior surface 22 of the intermediate section 24 of the member 14. Thus, the bolt head 20 is restricted from rotating within the member 14 during rotation of the nut and tightening of the clip 10. Other bolt head shapes including at least two straight sides parallel to each other, such as square, may alternatively be used.

In an alternate embodiment, the planes $P_1$ of the side sections 28 may be bent to form an angle θ of about 2 degrees from vertical, wherein the bolt 16 is contained within the member 14 prior to shipping. This further simplifies the handling and installation of the clip 10 of the present invention. This embodiment still provides adequate clearance between the side sections 28 for the direct insertion of the rail 12 into the member 14, and the rail 12 is held in the clip 10 as the bolt 16 is mounted to the support bar and the nut is tightened thereon. However, the bolt 16 is not able to be removed from the hole 18 because the bolt head 20 is not permitted to clear the side walls 28 of the member 14.

Figure 5:
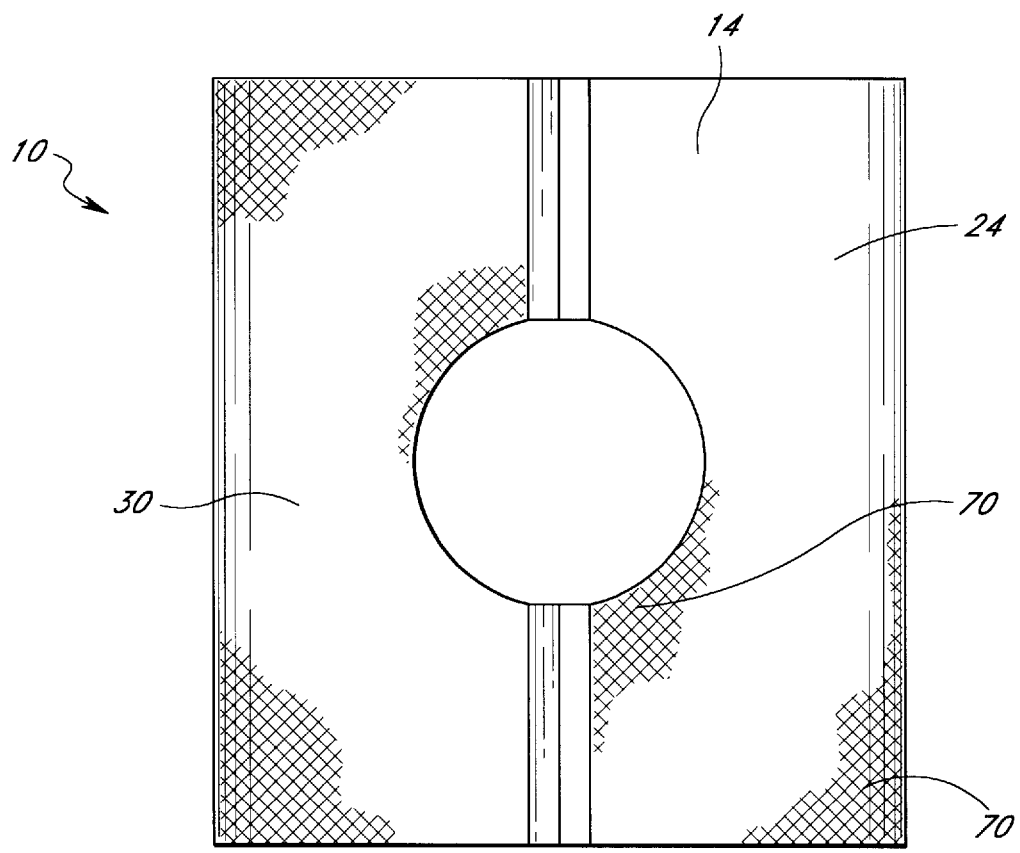
FIG. 5 is a bottom plan view of the compression clip of FIG. 1.

The clip 10 of the present invention is manufactured utilizing standard manufactured techniques such as for the groove forming, hole drilling, bending and cutting of the member. The bolt 16 is of construction known to those of ordinary skill in the art, and the shaft diameter and thread dimensions conform to use with standard available nuts. The member 14 and the bolt 16 are preferably stainless steel or carbon steel. Plastic may alternately be used for the member 14 in reduced stress environments. A steel washer (not shown) may optionally be used with the nut on the opposite side of the support bar from the member 14. To enhance gripping by the member 14 of the mating surface of the support bar, so that the clip 10 does not rotate from its desired position, it is preferred to have knurling 70 (FIG. 5) on the exterior surface 30 of the member 14. Ridges or other texturing of the exterior surface 30 which provide similar gripping may be substituted.

Thus, a compression clip constructed in accordance with the present invention comprises a member 14 having grooves 26, 32 on its interior and exterior surfaces 22, 30 which provide predictable and controlled member bending and gripping of a guide rail 12 or a wear strip member for the conveyor system. The self-tightening clip 10 also preferably includes a bolt 16 having a flat-sided head 20 which prevents rotation of the bolt 16 with respect to the member 14. The guide rail 12 may be pre-inserted into the member 14 of the clip 10 for the mounting of the clip 10 to the support bar without the need to grasp the bolt 16 to prevent its rotation. Further convenience is provided by optional pre-bending of the side sections 28 so that the bolt 16 is contained within the member 14 during shipping, so that an installer need not insert the bolt 16 through the hole 18 as a preliminary step for installing the clip 10 on the support bar. In addition, a self-tightening compression clip 10 having double the length and comprising two bolts 16 (not shown) is contemplated in an alternative embodiment of the present invention. Such a compression clip may be utilized to secure two adjacent guide rails. Each guide rail would occupy about ½ of the length of the clip. Preferably slots would be provided at the midpoint of the side walls of this embodiment so that the guide rails could be secured independently through use of the corresponding bolt as will be readily understood by those of skill in the art.

The dimensions recited herein may easily be modified as will be readily understood by those of skill in the art to accommodate a wide range of guide rail or wear strip shapes and sizes.

The embodiments illustrated and described above are provided merely as examples of the self-tightening compression clip constructed in accordance with the present invention. Other changes and modifications can be made from the embodiments presented herein by those skilled in the art without departure from the spirit and scope of the invention, as defined by the appended claims.

What is claimed is:

1. A guide rail assembly of a conveyor system defining a pathway along which articles travel, comprising:
   an elongate guide rail extending alone said pathway for guiding said articles along said pathway; and
   at least one guide rail support engaging said guide rail, said support comprising:
      a self-tightening member having two side sections and an intermediate section therebetween, said intermediate section having a hole, a grooved interior surface and a grooved exterior surface, said intermediate section defining an obtuse angle α prior to tightening of said clip; and
      a bolt received in said hole of said member for attaching said clip to said guide rail and for tightening of said clip;
      wherein after tightening said clip, said intermediate section substantially flattens to form an obtuse angle α' and said side sections are compressed inward whereby said guide rail is securely engaged within said clip.

2. The clip of claim 1 wherein α is less than α'.

3. The clip of claim 1, wherein said intermediate section forms an angle, α, of about 160 degrees prior to tightening of said clip and an angle, α', about 178 degrees after tightening of said clip.

4. The clip of claim 1, wherein each of said side sections is bent inward approximately 2 degrees from vertical such that said bolt may not be removed from said member.

5. The clip of claim 1, wherein a groove in said interior surface comprises a radius of curvature of about 0.016 inches and forms interior groove sides about 115 degrees apart.

6. The clip of claim 1, wherein a groove in said exterior surface comprises a radius of curvature of about 0.016 inches and forms exterior groove sides about 117 degrees apart.

7. The clip of claim 1, wherein said interior and exterior grooves are separated by at least about 0.025 inches.

8. The clip of claim 1, wherein said bolt has a head with at least two substantially straight edges substantially parallel to each other.

9. The clip of claim 8, wherein said bolt head is substantially rectangular.

10. The clip of claim 1, wherein said exterior surface of said member has knurling for enhanced gripping of said clip to said assembly.

11. The clip of claim 1, wherein said member is formed from steel.

12. The clip of claim 1, wherein said member is formed from plastic.

13. In combination, an elongate guide rail and a compression clip securing said guide rail in a conveyor assembly in which said guide rail guides articles along a path of said conveyor assembly, comprising:
   a fastener for attaching said clip to said conveyer assembly, said fastener having a flat head having two substantially straight sides substantially parallel to each other; and
   a member having two side sections, an intermediate section formed between said side sections, and a hole in said intermediate section for receiving said fastener, said side sections extending beyond the top of said head of said fastener, said intermediate section having an interior and an exterior groove substantially bisecting said intermediate section into two portions, said portions forming an obtuse angle between exterior surfaces of said portions prior to tightening of said clip;

wherein after tightening of said clip, said obtuse angle is increased and said side sections are compressed thereby securely engaging said guide rail in said clip.

14. The clip of claim 13, wherein before use of said clip in said assembly each of said side sections is bent inward by approximately 2 degrees from vertical such that said bolt may not be removed from said member prior to tightening of said clip.

15. The clip of claim 13, wherein said obtuse angle is about 160 degrees prior to tightening and about 178 degrees after tightening.

16. The clip of claim 13, wherein said interior groove comprises a radius of curvature of about 0.016 inches and forms interior groove sides about 115 degrees apart.

17. The clip of claim 13, wherein said exterior groove comprises a radius of curvature of about 0.016 inches and forms exterior groove sides about 117 degrees apart.

18. The clip of claim 13, wherein said interior and exterior grooves are separated by at least about 0.025 inches.

19. The clip of claim 13, wherein said head of said bolt is substantially rectangular.

20. The clip of claim 13, wherein said member is formed from steel.

21. The clip of claim 13, wherein said member is formed from plastic.

* * * * *